(12) United States Patent
Mendoza-Vega et al.

(10) Patent No.: US 10,962,108 B2
(45) Date of Patent: Mar. 30, 2021

(54) SHIFT-BY-WIRE (SBW) COLUMN SHIFTER

(71) Applicant: Ficosa North America Corporation, Madison Heights, MI (US)

(72) Inventors: Alejandro Mendoza-Vega, Rochester Hills, MI (US); Javier Alvarez Rubio, Rochester Hills, MI (US)

(73) Assignee: Ficosa North America Corporation, Madison Heights, MI (US)

( * ) Notice: Subject to any disclaimer, the term of this patent is extended or adjusted under 35 U.S.C. 154(b) by 193 days.

(21) Appl. No.: 16/147,960

(22) Filed: Oct. 1, 2018

(65) Prior Publication Data
US 2020/0103022 A1 Apr. 2, 2020

(51) Int. Cl.
| | | |
|---|---|---|
| *B60K 17/04* | (2006.01) | |
| *B60K 17/12* | (2006.01) | |
| *F16H 61/24* | (2006.01) | |
| *B60K 20/06* | (2006.01) | |
| *F16H 59/10* | (2006.01) | |
| *F16H 59/02* | (2006.01) | |

(52) U.S. Cl.
CPC ............. *F16H 61/24* (2013.01); *B60K 20/06* (2013.01); *F16H 59/105* (2013.01); *F16H 2059/026* (2013.01); *F16H 2061/243* (2013.01); *F16H 2061/247* (2013.01)

(58) Field of Classification Search
CPC ......... F16H 2061/247; F16H 2061/243; F16H 2059/026; F16H 59/105; F16H 61/24; B60K 20/06
See application file for complete search history.

(56) References Cited

U.S. PATENT DOCUMENTS

| | | | | |
|---|---|---|---|---|
| 4,537,088 A | * | 8/1985 | Kubota | B60K 20/06 74/473.21 |
| 5,307,013 A | * | 4/1994 | Santos | F16H 59/105 324/207.2 |
| 6,699,155 B2 | | 3/2004 | Nagasaka | |
| 6,834,563 B2 | | 12/2004 | Seekircher | |
| 8,075,447 B2 | | 12/2011 | Hori et al. | |
| 10,281,028 B2 | * | 5/2019 | Recio | F16H 59/044 |
| 2004/0035237 A1 | * | 2/2004 | Matsui | F16H 59/105 74/473.12 |
| 2005/0056109 A1 | | 3/2005 | Kim | |

(Continued)

FOREIGN PATENT DOCUMENTS

| | | |
|---|---|---|
| JP | 2007071370 A | 3/2007 |
| JP | 2008105650 A | 5/2008 |
| KR | 20050023143 A | 3/2005 |

*Primary Examiner* — Jake Cook
(74) *Attorney, Agent, or Firm* — Brooks Kushman P.C.

(57) ABSTRACT

A shift-by-wire (SBW) column shifter for a vehicle includes a shift lever configured to be moved to shift gears. A shaft enables the shift lever to rotate the shaft about an axis. A lever detent is coupled to the shaft, enabling the shaft to rotate the lever detent about the axis. A slider magnet is constrained to move along a path, such as a linear path. The slider magnet has a groove that is engaged by a projection of the lever detent. Rotation of the lever detent about the axis is converted into movement of the slider magnet along the path via the engagement of the projection and the groove. A plurality of sensors are configured to output signals indicating a position of the slider magnet along the path to indicate a requested change in operating gear of the vehicle.

19 Claims, 6 Drawing Sheets

(56) References Cited

U.S. PATENT DOCUMENTS

| | | | |
|---|---|---|---|
| 2007/0193385 A1* | 8/2007 | Hermansson | F16H 59/105 74/473.1 |
| 2010/0071506 A1* | 3/2010 | Kliemannel | F16H 61/22 74/625 |
| 2011/0025308 A1* | 2/2011 | Kitanaka | F16H 59/105 324/207.11 |
| 2012/0000309 A1* | 1/2012 | Takagi | G01D 11/24 74/473.1 |
| 2012/0285284 A1* | 11/2012 | Wang | F16H 59/10 74/473.3 |
| 2014/0174233 A1* | 6/2014 | Giefer | F16H 59/10 74/473.3 |
| 2018/0283543 A1* | 10/2018 | Cha | F16H 61/24 |
| 2019/0128404 A1* | 5/2019 | Morales | F16H 59/105 |

* cited by examiner

SHIFT-BY-WIRE (SBW) COLUMN SHIFTER

TECHNICAL FIELD

This disclosure is directed to shift-by-wire (SBW) column shifter for an automobile. In particular, the column shifter includes a shifter lever for shifting between gears (e.g., park, reverse, neutral, drive, etc.), wherein movement of the shifter lever electronically actuates the gear shift.

BACKGROUND

Vehicles having an automatic transmission typically include a shift control lever or a shifter mounted on a dashboard, a console, or the steering column of the vehicle. An operator of the vehicle may manually move the shifter between designated positions to change the gear position in which the transmission is commanded to operate. These gear positions include Park, Reverse, Neutral, Drive, and sometimes others, such as Low. The shifter is therefore commonly referred to by its acronym—a PRNDL or PRND shift mechanism.

Shift-by-wire (SBW) systems are known. In SBW systems, movement of the shift control lever causes electronic signals to be sent to a controller, which correspondingly electronically commands a change in the operating gear of the vehicle.

SUMMARY

In one embodiment, a shift-by-wire (SBW) column shifter for a vehicle includes a shift lever configured to be moved to shift gears. A shaft enables the shift lever to rotate the shaft about an axis. A lever detent is coupled to the shaft, enabling the shaft to rotate the lever detent about the axis. A slider magnet is constrained to move along a path, such as a linear path. The slider magnet has a groove that is engaged by a projection of the lever detent. Rotation of the lever detent about the axis is converted into movement of the slider magnet along the path via the engagement of the projection and the groove. A plurality of sensors are configured to output signals indicating a position of the slider magnet along the path to indicate a requested change in operating gear of the vehicle.

In another embodiment, a SBW column shifter includes a housing, and a lever detent rotatable within the housing in response to a shift lever moving to command a gear shift. The lever detent has an outer surface with a plurality of ramped surfaces leading to respective grooves therebetween. A spring is mounted to the housing. The spring has a free end biased against the outer surface of the lever detent, wherein the free end slides along the ramped surfaces and presses into the grooves as the lever detent rotates during the gear shift.

In yet another embodiment, a SBW system includes a lever detent rotatable about an axis in response to a shift lever moving to command a gear shift. The lever detent has an outer surface defining a plurality of ramped surfaces leading to respective grooves therebetween. The lever detent further has a main body with a projection extending therefrom at a location offset from the axis. A spring has a free end engaging the outer surface of the lever detent, the spring is configured to slide along the ramped surfaces and mate within the grooves as the lever detent rotates to provide a force feedback to the operator during shifting. A slider magnet is configured to move along a path. The slider magnet has a groove sized to receive the projection such that the projection slides within the groove as the lever detent rotates to convert rotation of the lever detent into movement of the slider. A plurality of sensors are located along the path and are configured to output collectively output various signal patterns indicating a location of the slider magnet. A controller is coupled to the sensors and is programmed to command the gear shift in response to a change in the signal patterns.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
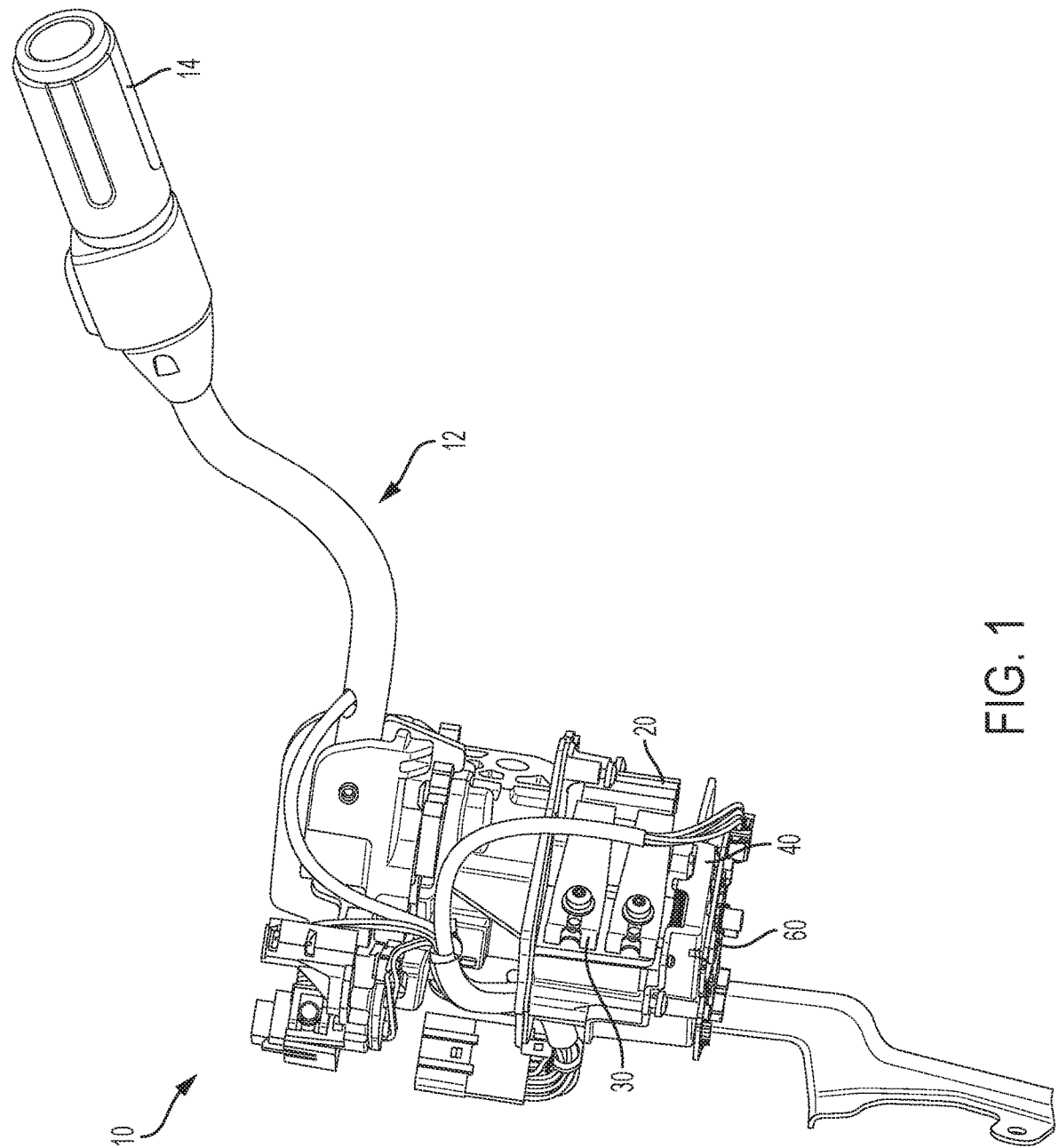
FIG. 1 is a perspective view of a shift-by-wire (SBW) column shifter, according to one embodiment.
Figure 2:
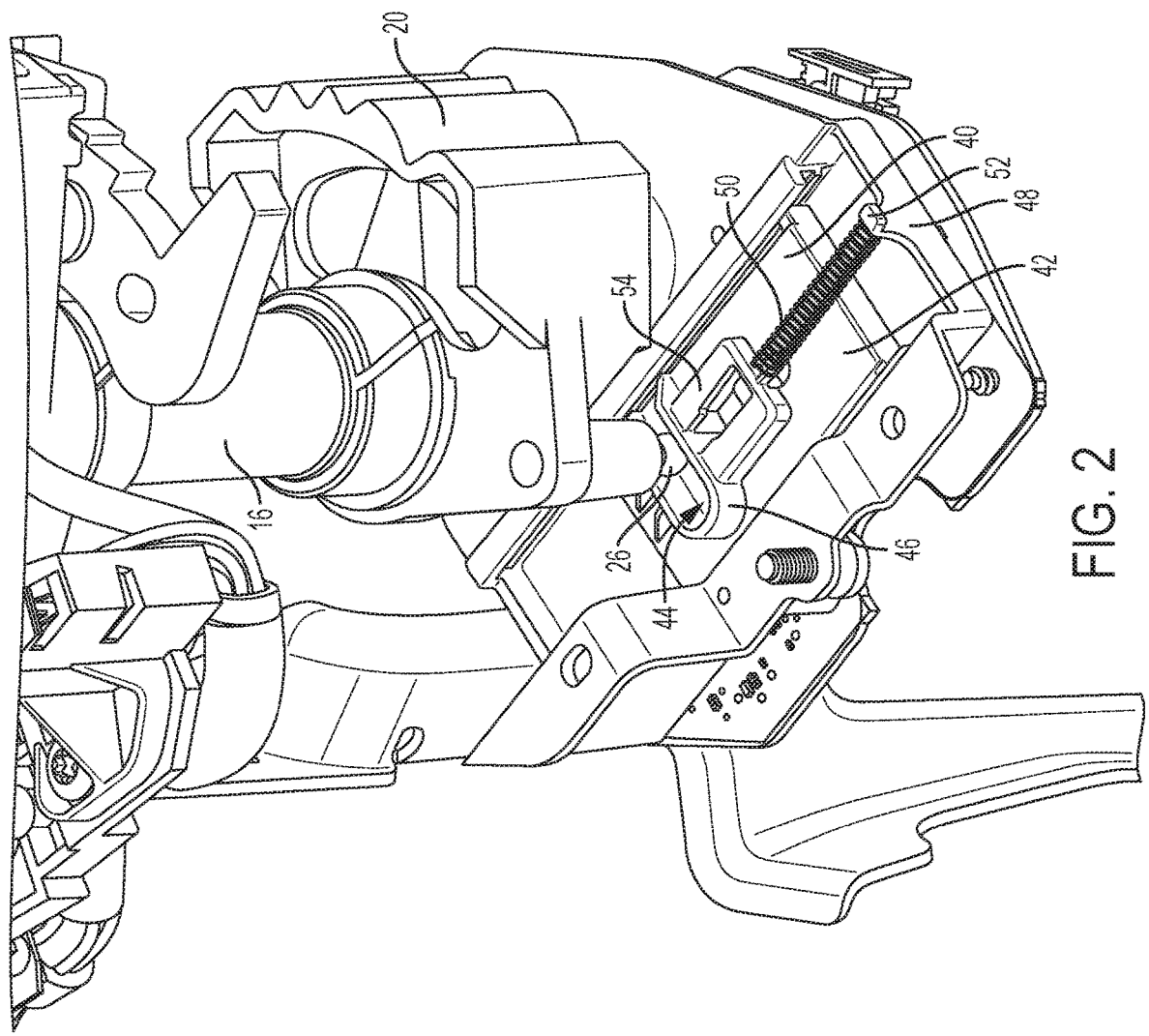
FIG. 2 is a perspective view of a region of the SBW column shifter, highlighting an engagement between a lever detent and a slider magnet, according to one embodiment.
Figure 3:
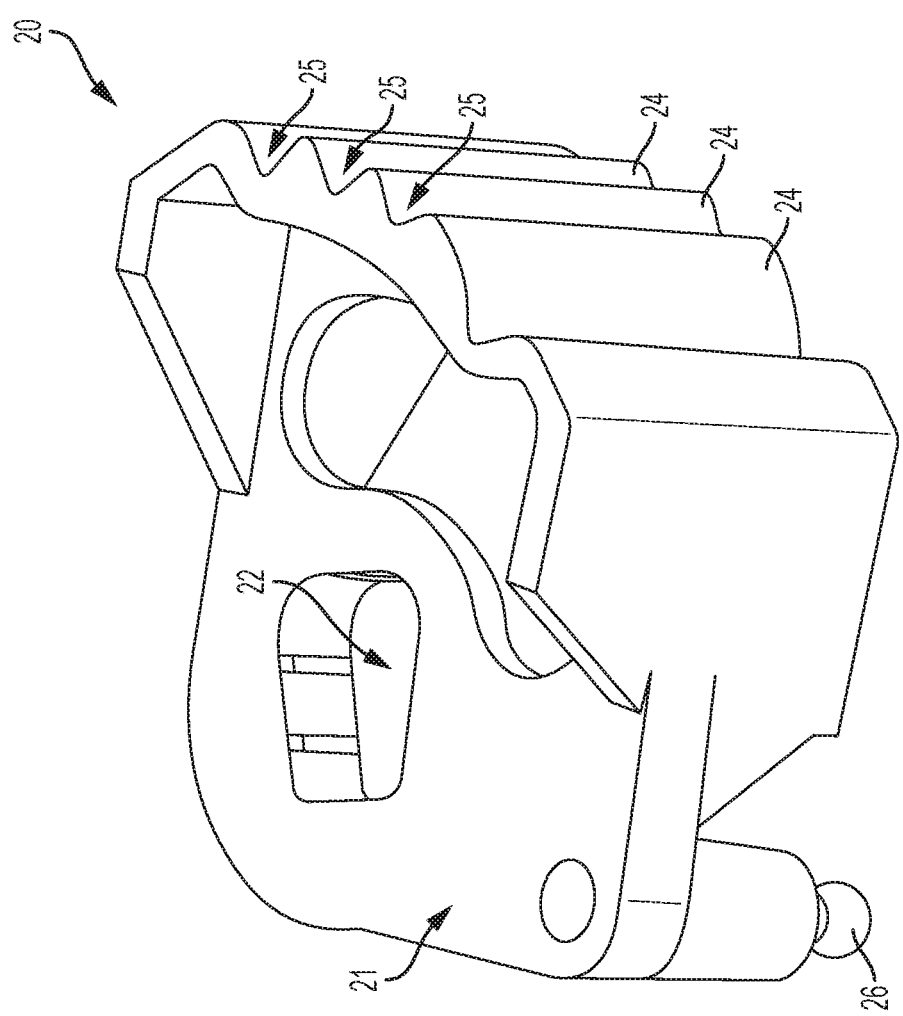
FIG. 3 is a perspective view of the lever detent of FIG. 2, according to one embodiment.

FIG. 1 shows a perspective view of a shift-by-wire (SBW) column shifter 10, according to one embodiment. An outer housing is removed for clarity of the internal components. The SBW column shifter 10 is configured to mount to or within a steering column of a vehicle, such as a pickup truck, car, van, sports utility vehicle (SUV), etc. The shifter 10 includes a shift lever 12 ending in a handle 14 extending outward from the housing and the steering column. In operation, an operator of the vehicle grabs the handle 14 and rotates the lever 12 to command a shift in the PRNDL operating gear of the vehicle (e.g., Park, Reverse, Neutral, Drive, Low, etc.).

Movement of the lever 12 causes mechanical movement within the SBW column shifter 10 that causes a corresponding electronic ("by-wire") shift in the operating gear. The structure and function associated with the change in operating gear during an electronic shift will be described below with respect to the remaining Figures. Some main components that will be described include a lever detent 20, leaf springs 30, a slider magnet 40, and a printed circuit assembly 60 having a plurality of sensors and a corresponding controller.

Referring to FIGS. 2-6, rotation of the shift lever 12 rotates a connected shaft 16 about its central longitudinal axis. The shaft 16 couples to the lever detent 20. In one embodiment, the lever detent 20 has a main body 21 defining an aperture 22 therethrough, and the shaft 16 couples to the lever detent 20 through the aperture 22. Rotation of the shaft 16 correspondingly rotates the connected lever detent 20. Rotation of the lever detent 20 causes the slider magnet 40 to slide linearly, as will be described below.

The lever detent 20 has an outer surface with a plurality of surface features (e.g., peaks and valleys). For example, the outer surface of the lever detent 20 can include a plurality of sloped sidewalls 24. Two of the sidewalls 24 can come together to form a groove 25, so that the outer surface defines a plurality of grooves 25, each banked by a sloped sidewall 24. Lubricant or grease can be provided in the grooves 25.

Figure 4:
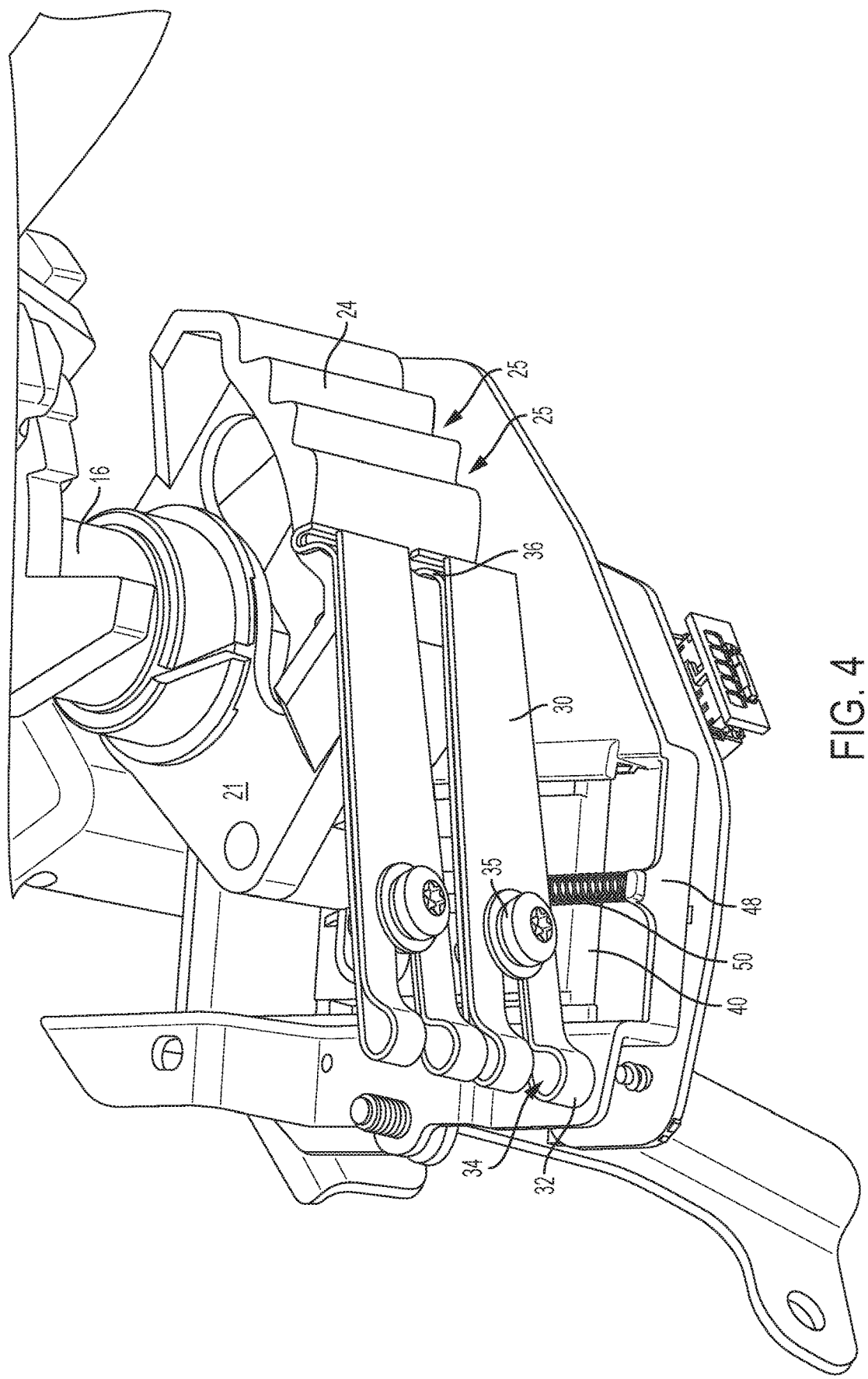
FIG. 4 is a perspective view of another region of the SBW column shifter, highlighting an engagement between the lever detent and leaf springs, according to one embodiment.

The grooves 25 engage with the leaf springs 30 as the lever detent 20 is rotated. As shown in FIG. 4, two generally identical leaf springs 30 can be provided (and therefore only one of the leaf springs will be described to remove redundancy). Each leaf spring 30 can be formed of a single continuous piece of material (e.g., steel, aluminum, etc.) that is bend to shape. Each leaf spring has one end 32 with a groove 34 formed therein to receive a fastener 35 (e.g., screw, bolt, etc.) to mount that leaf spring 30 to the housing (which is not shown for clarity). A second end 36 of each leaf spring 30 is bent, curved, or rounded to shape to facilitate a sliding and pivotal movement along the sidewalls 24.

When the vehicle is operating in a first gear (e.g., PRND), the curved second end 36 is located within one of the grooves 25 of the lever detent 20. During a shift of operating gears, the lever detent 20 rotates, causing deflection or bending of the springs 30 in which the second end 36 of each spring 30 slides along one of the sidewalls 24, radially away from the rotating shaft 16. This bends the spring 30 about the fixed point of attachment (e.g., the fastener 35). The spring bias against the lever detent 20 provides a force or mechanical feedback to the driver, simulating a feel of a resistance force that would otherwise be present in a traditional non-by-wire gear shifter with mechanical linkages. Once the lever detent 20 has been rotated far enough, the springs 30 are able to bend back to their biased position in which the second end 36 returns radially inward to rest within another one of the grooves 25. When in position within one of the grooves 25, the spring 30 maintains the lever detent 20 in a fixed location until another change in operating gear is commanded by the driver.

While a leaf spring is described herein, it should be understood that the present disclosure is not limited to such a particular type of spring. Instead, the spring may be any type of spring that can provide mechanical feedback to the driver by pressing against the lever detent during rotation of the lever detent when shifting gears. For example, the spring may be of the type that compresses and expands in a linear path as the lever detent is rotated.

In one embodiment, the number of grooves 25 in the lever detent 20 can be equal to the number of operating gears (e.g., PRND) available for selection by the driver. For each operating gear selected, the spring 30 is received within a designated groove 25 associated with that selected gear, which maintains the slider magnet 40 to a corresponding designated linear position for that selected gear.

Rotation of the lever detent 20 causes a corresponding linear sliding movement of the slider magnet 40. In one embodiment, the main body 21 of the lever detent 20 has a projection 26 extending therefrom. In one embodiment, the projection 26 is spherical, rounded, or frusto-spherical. The slider magnet 40 has an upper surface 42 facing the lever detent 20. The upper surface 42 has a groove 44 formed therein, which may be defined by or flanked within sidewalls 46 extending upward toward the lever detent 20 to direct movement of the projection 26. The groove 44 is sized and configured to receive the projection 26 in a sliding manner. The groove 44 extends linearly across the width of the slider magnet 40, and creates a linear pathway for the projection 26 to slide within. As the lever detent 20 is rotated, the projection 26 slides within the groove 44. And, the slider magnet 40 is bound to move linearly (e.g., forward and backward) within linearly-extending rails or walls 47 of a slider-magnet housing 48. The slider-magnet housing 48 may be mounted or fixed relative to the housing, such that the slider magnet 40 can slide within the stationary slider-magnet housing 48 during gear shifts. Thus, rotational movement of the lever detent 20 forces the projection 26 to move within the groove 44 of the slider magnet 40, causing the slider magnet 40 to move along a linear pathway. Rotational movement (of the lever detent) is therefore converted into linear movement (of the slider magnet) in this manner.

The slider magnet 40 is referred to as a "magnet" because it is at least partially magnetic. For example, the slider magnet 40 may be entirely made of a ferromagnetic material such as iron, nickel, cobalt, rare-earth metals, etc. In another embodiment, a ferromagnetic material is impregnated or bonded to a base material of the slider, such as aluminum, steel, etc. The slider magnet 40 may also be a multipolar magnet, built from multiple individual magnets, with each individual magnet serving an individual purpose of activating one of the sensors (explained below) when passing by. The slider magnet 40 may also be a single magnet with multiple poles. Furthermore, the use of the term "slider magnet" may also refer to the housing that surrounds or contains the magnet itself.

Figure 5:
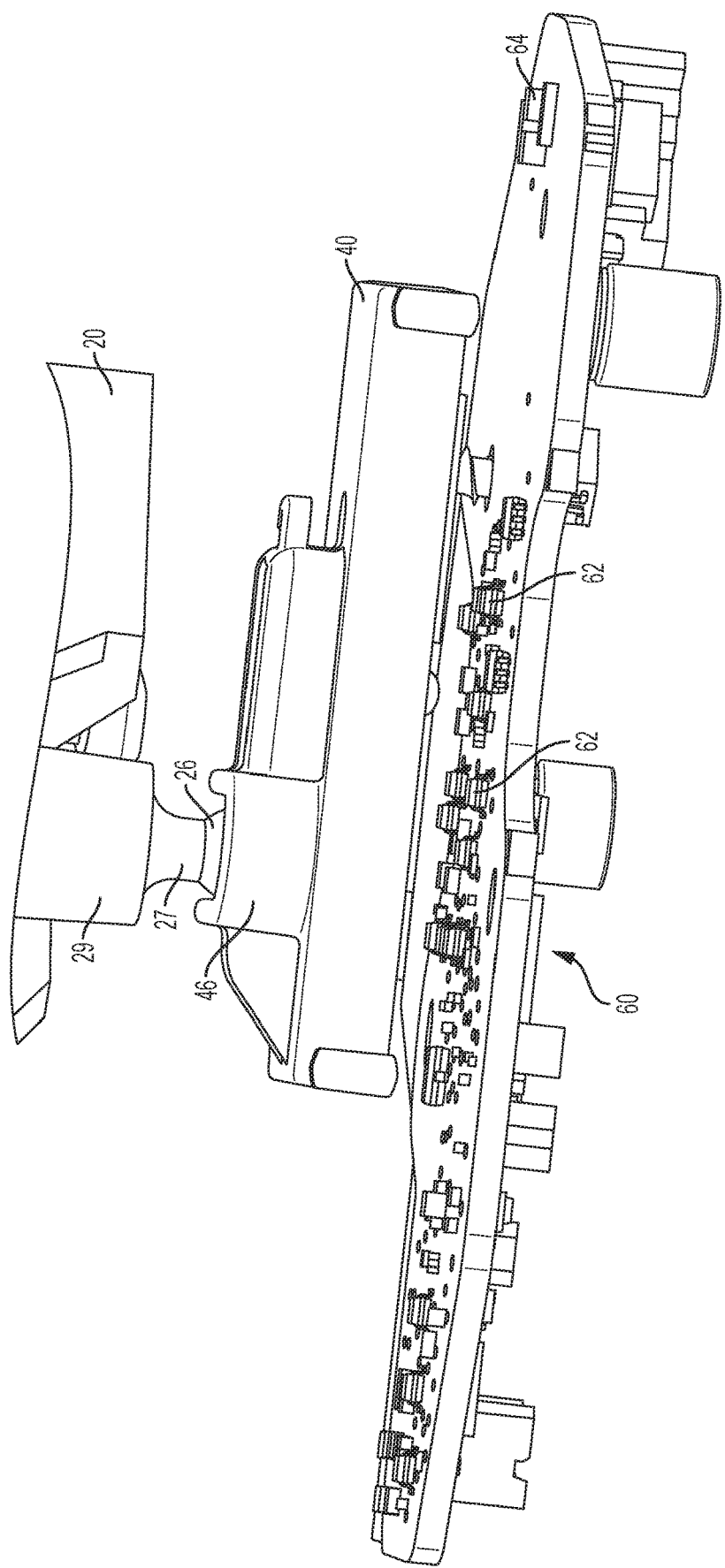
FIG. 5 is a side view of another region of the SBW column shifter, showing the engagement of the lever detent and the slider magnet, with the slider magnet spaced above a plurality of sensors, according to one embodiment.

As can be seen in FIG. 5 for example, a printed circuit assembly (PCA, also referred to as a printed circuit board or printed circuit board assembly) 60 is provided, fixed relative to the housing of the SBW column shifter 10 at a spaced location from the slider magnet 40. The PCA 60 includes a plurality of contactless sensors 62 configured to detect the presence and/or location of the slider magnet 40 by outputting signals in response to the presence of the magnetic field of the slider magnet 40 being aligned therewith. In one embodiment, the sensors 62 are Hall effect sensors each having a transducer that varies its output voltage in response to the magnetic field from the slider magnet 40. In particular, the Hall effect sensors can output a magnetic field that varies in response to a changing proximity of the slider magnet 40; when the magnetic field is increased above a certain low threshold, it can be determined (e.g., via an associated processor or controller) that the slider magnet 40 is in a location aligned with that sensor. The sensors 62 may be located along the linear path that the slider magnet 40 travels along during gear shifts. Thus, when the slider magnet 40 is moved to a particular location when shifting from one operating gear to another, one of the sensors 62 may be deactivated (e.g., magnetic field dropping below the threshold) while another sensor 62 may be activated (e.g., magnetic field increasing above the threshold).

The sensors 62 are coupled to an associated processor, microprocessor, controller or the like (hereinafter referred to as a processor) that can be either on-board the PCA 60 or off-board. In one embodiment, each of the sensors 62 is located at a particular location such that each respective sensor 62 is activated when the slider magnet 40 is in a particular location associated with the shifter 10 being set in a particular operating gear. In another embodiment, multiple sensors 62 may be located intermittently and in various locations, and a pattern of activated sensors indicates the position of the slider magnet 40. For example, when the shifter 10 is in Park, the slider magnet 40 may be located such that a first and a second sensor are activated. When the operator shifts gears to Reverse, the second and a third sensor may be activated while the first sensor is deactivated. Thus, while the second sensor is active for both the Park and Reverse gear selections, the overall pattern of sensor activity can be analyzed by the processor to determine which gear is selected by the driver. It should be understood that this is not limiting but merely an example of the concept of having an individual sensor that could be activated to indicate different gear selections. In other examples, a particular sensor might be activated for one or multiple gear selections including Park, Reverse, Neutral, Drive, Low, etc. The transmission can be commanded to be shifted by the processor accordingly. This operates the "by-wire" nature of the shifter 10.

The slider magnet 40 may be spring-biased to slide to a designated position in the event of a failure or break in the connection between the lever detent 20 and the slider magnet 40. For example, if an extremely large force is provided to the shifter 10, mechanical failure in the connection between the projection 26 and the groove 44 of the slider magnet 40 is always a possibility. To account for this possibility, a spring 50 biases the slider magnet 40 toward an end of the slider-magnet housing 48. In one embodiment, a first end of the spring 50 is connected to a tab 52 extending upward from a main tray body of the slider-magnet housing 48, and a second end of the spring is connected to a raised region 54 of the slider magnet 40. In the event of such an aforementioned mechanical failure in the connection at the projection 26 and groove 44, the spring 50 pulls the slider magnet 40 to a position that may only be attainable during such a failure. In other words, the slider magnet 40 slides to a linear position that it would not otherwise be able to slide to during normal shifting between gears. An associated sensor 64 (that can be a Hall effect sensor like the other sensors 62) can be located at a position such that it is activated when the slider magnet 40 is pulled to the designated position via the spring 50. That sensor 64 outputs a signal in response to the slider magnet 40 being in its designated position associated with a failure or break in the connection between the lever detent 20 and the slider magnet 40. The associated processor can infer from receiving a signal from the sensor 64 that such a mechanical failure or break has occurred, and can output a corresponding alert (e.g., video, audio, etc.) alerting the driver of a failure in the shifter 10. Alternatively, the alert can be a signal sent to an on-board diagnostic (OBD or OBD-II) port for a technician to diagnose the signal and determine that a failure in the shifter 10 has occurred.

To facilitate the proper movement of the slider magnet 40 in the event of such a mechanical failure, the lever detent 20 is provided with a region of thinned or weakened material. For example, the projection 26 may include a detent shaft 27, with the spherical or frusto-spherical region extending from the detent shaft 27. The detent shaft 27 may also be another shape, such as cylindrical. The detent shaft 27 may extend from a larger shaft 29 that has a diameter that exceeds that of the detent shaft 27. In the event of an extremely large force being applied to the lever detent, the break between the lever detent 20 and the slider magnet 40 may be concentrated at the detent shaft 27 to facilitate the break, allowing the slider magnet 40 to cleanly break away from the lever detent 20 and slide to its designated position aligned with the sensor 64.

Figure 6:
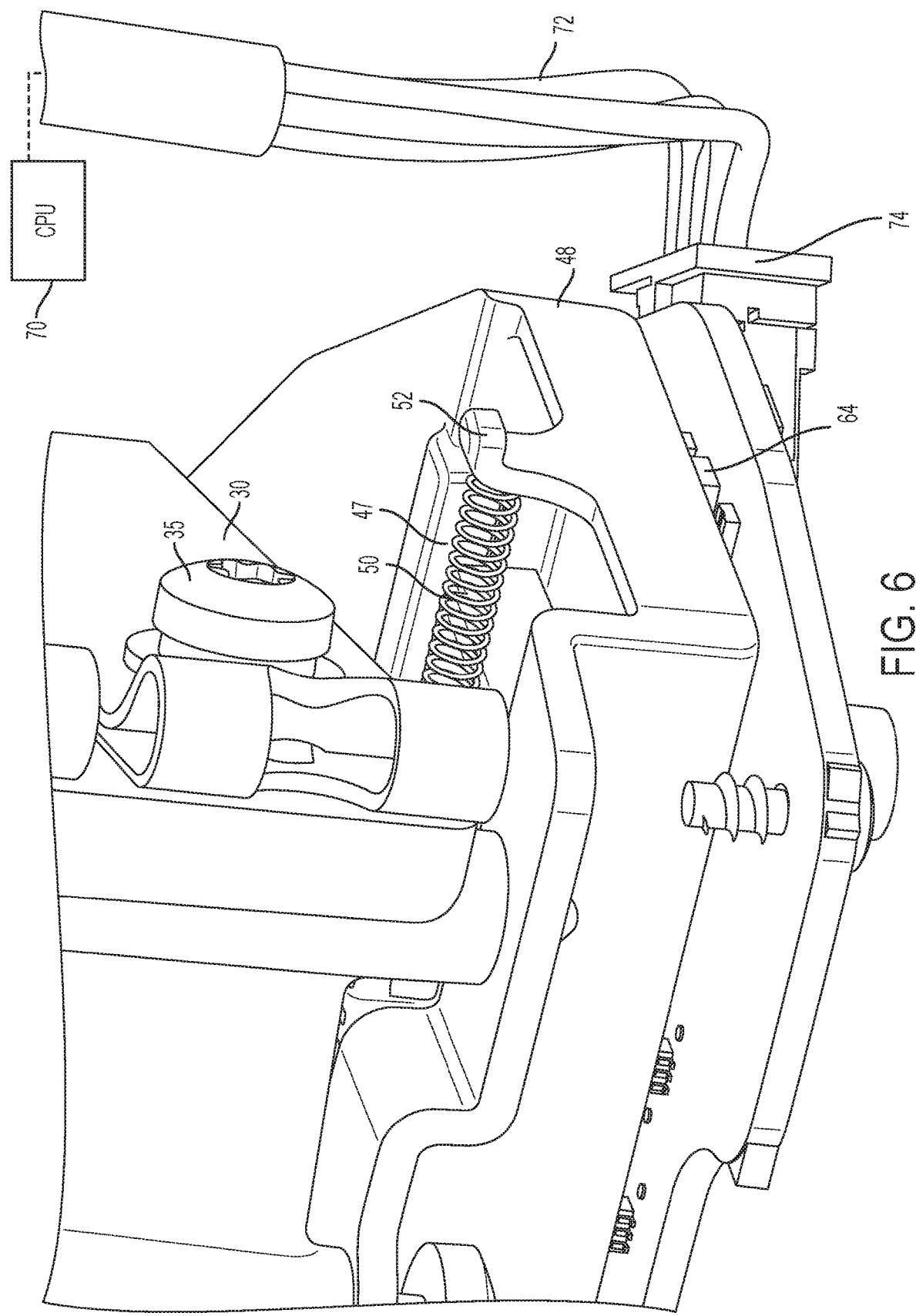
FIG. 6 is a perspective view of another region of the SBW column shifter, showing a portion of one of the clips as well as a spring biasing the slider magnet to a set position, according to one embodiment.

FIG. 6 shows a processor or CPU 70 that is connected via wires 72 and a wire connection 74 to the PCA 60 and associated sensors. It should be understood that the CPU 70 may also be located directly on-board the PCA 60. In one embodiment, the CPU 70 is responsible for receiving the signals output from the sensors 62, 64, processing those signals, and commanding the shift in operating gears described above. As such, the CPU 70 can be coupled to a transmission control unit (TCU), powertrain control unit (PCU), or the like that is responsible for commanding the shift in operating gears. The CPU 70 can be provided with or be in communication with a storage medium that associates activated sensors with an operating gear that should be selected.

While illustrated as one processor 70, the CPU may be part of a larger control system and may be controlled by various other controllers throughout the vehicle, such as a vehicle system controller (VSC). It should therefore be understood that the CPU 70 and one or more other controllers responsible for receiving signals from the PCA 60 and commanding the associated shift in operating gears can collectively be referred to as a "controller". The controller may include a microprocessor or central processing unit (CPU) in communication with various types of computer readable storage devices or media. Computer readable storage devices or media may include volatile and non-volatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices, such as PROMs (programmable read-only memory), EPROMs (electrically PROM), EEPROMs (electrically erasable PROM), flash memory, or any other electric, magnetic, optical, or combination of memory devices capable of storing data, some of which represent executable instructions, used by the controller in controlling the engine or vehicle.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media, such as ROM devices, and information alterably stored on writeable storage media, such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A shift-by-wire (SBW) column shifter configured to mount to or within a steering column of a vehicle, the SBW column shifter comprising:
    a shift lever configured to be moved to shift gears;
    a shaft coupled to the shift lever to enable the shift lever to rotate the shaft about an axis;
    a lever detent coupled to the shaft to enable the shaft to rotate the lever detent about the axis, the lever detent having a projection extending from a location offset from the axis;
    a slider magnet constrained to move linearly, the slider magnet having a groove that is engaged by the projection of the lever detent, wherein rotational movement of the lever detent about the axis is converted into linear movement of the slider magnet via the engagement of the projection and the groove; and
    a plurality of sensors configured to output signals indicating a linear position of the slider magnet, wherein the signals are indicative of a command to change an operating gear of the vehicle.

2. The SBW column shifter of claim 1, wherein the lever detent has an outer surface with a plurality of ramped walls located between respective grooves.

3. The SBW column shifter of claim 2, further comprising a spring having a rounded free end configured to provide a force against the ramped walls as the lever detent is rotated and configured to maintain the lever detent in a position when the lever detent is not rotated.

4. The SBW column shifter of claim 3, wherein the spring is a first leaf spring, the SBW column shifter further comprising a second leaf spring configured to provide a force against the ramped walls in the event of a failure of the first leaf spring.

5. The SBW column shifter of claim 3, further comprising a housing having an aperture extending therethrough that receives the shaft, the shaft being rotabale within the aperture and relative to the housing, wherein the spring is mounted to the housing.

6. The SBW column shifter of claim 1, wherein the projection of the lever detent includes a detent shaft and a spherical region extending from the detent shaft, wherein a diameter of the spherical region exceeds a diameter of the detent shaft.

7. The SBW column shifter of claim 6, wherein the detent shaft extends from a larger shaft having a diameter that exceeds the diameter of the detent shaft.

8. The SBW column shifter of claim 1, further comprising a spring attached to the slider magnet that biases the slider magnet toward a fixed position, wherein the spring forces the slider magnet to the fixed position in response to the projection being disconnected from the slider magnet.

9. A shift-by-wire (SBW) column shifter configured to mount to or within a steering column of a vehicle, the SBW column shifter comprising:
    a housing;
    a lever detent rotatable within the housing in response to a shift lever moving to command a gear shift, the lever detent having an outer surface with a plurality of ramped surfaces leading to respective grooves therebetween;
    a spring mounted to the housing, the spring having a free end biased against the outer surface of the lever detent, wherein the free end slides along the ramped surfaces and presses into the grooves as the lever detent rotates during the gear shift; and
    a controller programmed to command a change in an operating gear as the lever detent rotates, wherein each of the grooves is associated with a respective one of the operating gears.

10. The SBW column shifter of claim 9, wherein the spring has a spring biasing force to maintain a selected gear and to inhibit the lever detent from rotating without the shift lever moving.

11. The SBW column shifter of claim 9, wherein the spring is mounted to the housing at an attachment point, and the spring is configured to bend about the attachment point as the free end slides along the ramped surfaces.

12. The SBW column shifter of claim 9, further comprising a slider magnet constrained to move linearly and having a groove formed therein, wherein the lever detent includes a main body and a projection extending therefrom that is received in the groove such that the rotation of the lever detent is converted into linear movement of the slider magnet via sliding of the projection within the groove.

13. The SBW column shifter of claim 12, further comprising a plurality of sensors configured to output signals indicating a position of the slider magnet, wherein the controller is further programmed to command the change in the operating gear in response to the signals.

14. The SBW column shifter of claim 13, wherein the slider magnet is magnetic and the sensors are Hall-effect sensors.

15. A shift-by-wire (SBW) system comprising:
    a lever detent rotatable about an axis in response to a shift lever moving to command a gear shift, the lever detent having an outer surface defining a plurality of ramped surfaces leading to respective grooves therebetween, the lever detent further having a main body with a projection extending therefrom at a location offset from the axis;
    a spring having a free end engaging the outer surface of the lever detent, the spring configured to slide along the ramped surfaces and mate within the grooves as the lever detent rotates to provide a force feedback to an operator during shifting;

a slider magnet configured to move along a path, the slider magnet having a groove sized to receive the projection such that the projection slides within the groove as the lever detent rotates to convert rotation of the lever detent into movement of the slider magnet;

a plurality of sensors located along the path and configured to output collectively output various signal patterns indicating a location of the slider magnet; and a controller coupled to the sensors and programmed to command the gear shift in response to a change in the signal patterns.

16. The SBW system of claim 15, wherein the slider magnet assumes a plurality of set positions each corresponding to a rotational position of the lever detent in which the spring engages a respective one of the grooves, and wherein the signal patterns include at least two of the sensors actively outputting a signal indicating the presence of the slider magnet for each of the set positions of the lever detent.

17. The SBW system of claim 16, wherein the change in signal patterns includes a first sensor continuing to actively output the signal indicating the presence of the slider magnet and a second sensor activating to output a signal indicating the presence of the slider magnet.

18. The SBW system of claim 16, further comprising a second spring coupled to the slider magnet and forcing the slider magnet to a unique position along the linear path that the slider magnet assumes in the event of a disconnect between the slider magnet and the lever detent, wherein the plurality of sensors includes a dedicated sensor that outputs a signal indicating the location of the slider magnet being moved to the unique position.

19. The SBW system of claim 18, wherein the controller is further programmed to output a signal indicating a failure in the SBW system in response to receiving the signal from the dedicated sensor.

* * * * *